Nov. 15, 1927.
J. J. SIEFEN
1,649,620
FLOAT VALVE
Filed April 15, 1926
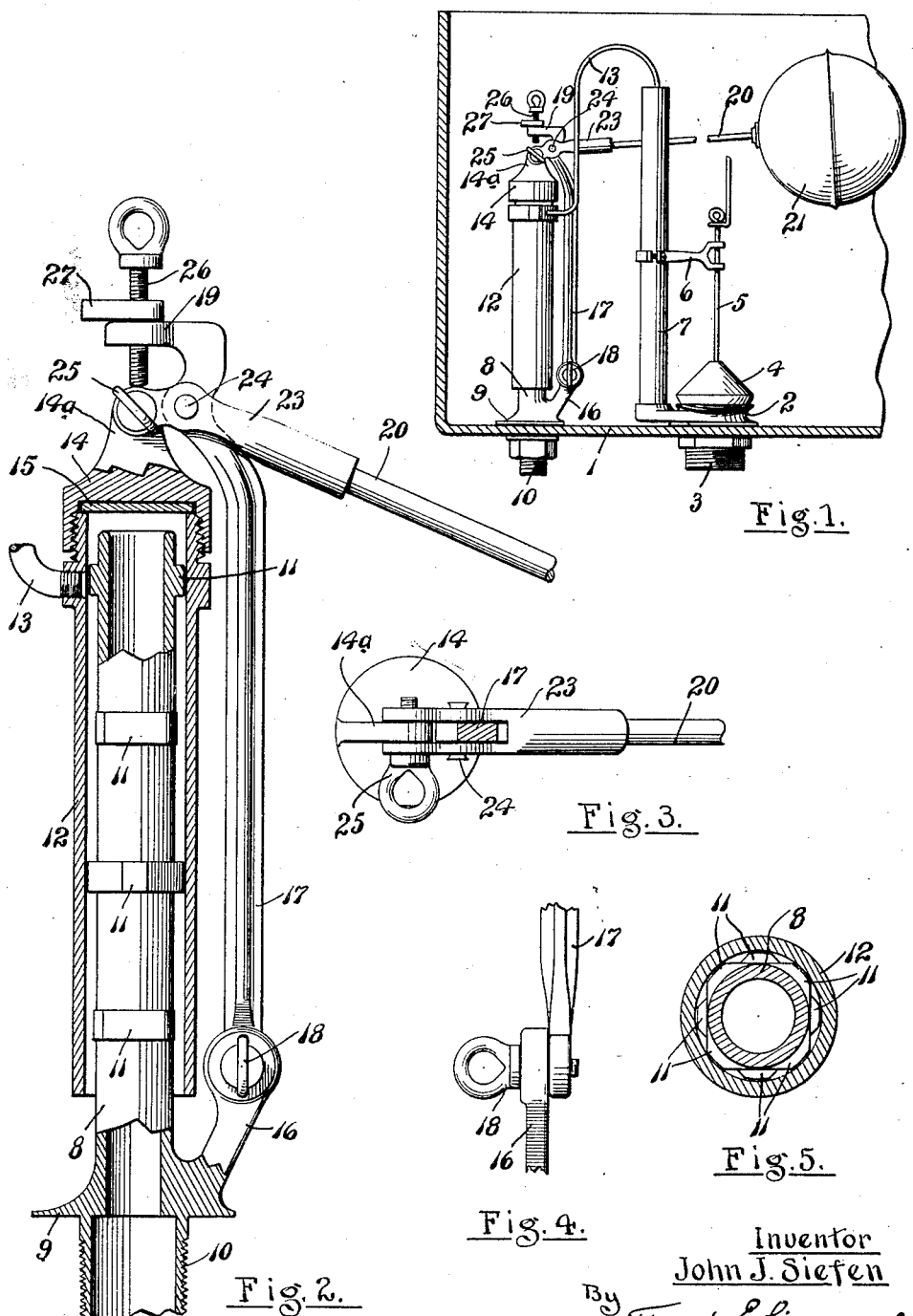
Inventor
John J. Siefen
By Frank E. Liverance, Jr.
Attorney.

Patented Nov. 15, 1927.

1,649,620

UNITED STATES PATENT OFFICE.

JOHN J. SIEFEN, OF GREENVILLE, MICHIGAN, ASSIGNOR TO BENNETT BRASS COMPANY, OF GREENVILLE, MICHIGAN, A CORPORATION OF MICHIGAN.

FLOAT VALVE.

Application filed April 15, 1926. Serial No. 102,144.

This invention relates to a float valve designed for use in connection with flushing tanks. It is a primary object and purpose of the present invention to provide a float valve construction wherein the flow of water for the purpose of refilling a tank when it has been emptied or flushed, is without noise, the water being compelled to follow a tortuous passage and entering the tank under the upper level of water therein which substantially eliminates noise heretofore present in constructions of this character. A further object of the invention is to provide a structure of the class described which is very easily repaired particularly in the replacement of a washer of leather, rubber or similar material which is used to stop the flow of water when the tank is filled to a predetermined level, this washer at times needing replacement. And the structure is so designed that with the removal of one screw it is possible to gain access to the washer, removing it and replacing it very quickly and expeditiously. A still further object of the invention is to provide a very simple means of adjustment so that the flow of water to the tank may be regulated in conformity with the pressure of water in the water main which supplies water to the tank. This adjustment is very simple and effective and may be changed almost instantly if necessary and may be fixed at the time of installation in accordance with the pressure in the main.

Various other objects and purposes than those stated together with novel construction and arrangements of parts for effecting the same will appear as understanding of the invention is had from the following description taken in connection with the accompanying drawing, in which Fig. 1 is a fragmentary section through a tank equipped with my invention, the float valve mechanism being shown in elevation.

Fig. 2 is an enlarged vertical section through the valve construction showing the manner in which it is made and assembled.

Fig. 3 is a fragmentary horizontal section at the upper part of the construction shown in Fig. 2.

Fig. 4 is a fragmentary side elevation of a detail of the construction, and

Fig. 5 is a horizontal section through the water entrance pipe and the sleeve over the same, shown in Fig. 2.

Like reference characters refer to like parts in the different figures of the drawing.

The tank 1 is of any conventional construction having its upper end open, it being understood that in practice this upper end is closed by a removable cover, in which tank the mechanism of my invention is installed. A valve seat member 2 is located above the bottom of the tank and has a neck 3 extending therethrough, water escaping through the same from the tank to the bowl to be flushed. The usual hollow rubber ball valve 4 seats in the seat 2 to prevent escape of water except when the ball 4 is elevated, said ball valve having a rod 5 extending upwardly therefrom guided through a guide 6 which is fixed to a vertical overflow pipe 7 open at its upper end and connected at its lower end to an extension of the seat member 2, this being a well known and conventional construction in apparatus of this character.

Near one end of the tank a vertical pipe 8 is located, being formed adjacent its lower end with an enlarged base 9 which bears against the upper side of the bottom of the tank, an extension 10 passing through the bottom of the tank and being threaded to receive a nut which securely binds pipe 8 in place. To the extension 10 suitable pipe connections are made with the water main. The pipe 8 extends upwardly into the tank for a distance and at spaced apart points in its length has a series of lugs indicated at 11 extending laterally therefrom, these lugs being located at different positions around the pipe, as shown.

An elongated sleeve 12 passes over the pipe 8, the lugs 11 from said pipe extending substantially to the inner sides of said sleeve, as best shown in Fig. 5. A small pipe 13 is connected with the sleeve 12 near its upper end and extends to and into the upper end of the overflow pipe 7 previously described. The upper end of the sleeve 12 is closed by a cap 14 and between said cap and the upper end of the sleeve 12 a washer 15 is positioned and secured. This washer is of any suitable material such as leather, rubber or the like and when the sleeve 12 with attached parts is in lower position the washer bears against the upper end of the pipe 8 and closes the same. The cap 14 is formed at its upper side with an upwardly extending lug 14$^a$, the purpose of which will later appear.

At one side of the base 9 an arm 16 is cast integral therewith extending upwardly and outwardly at an angle to the vertical, to the upper end of which a bar 17 is pivotally mounted by means of an eye screw 18 which passes freely through the upper end of the arm 16 and threads through the lower end of bar 17. Bar 17 lies alongside of and is parallel to the sleeve 12, above the same at its upper end being turned inwardly toward the lug 14$^a$ of the cap and thence extending upwardly for a short distance and turned horizontally making the arm 19 which lies directly over the lug 14$^a$. At one end of a rod 20 the usual hollow metal float 21 is secured. The opposite end of the rod 20 is secured to a sleeve 23 which is divided to pass by at each side of the bar 17 being pivotally connected thereto, as indicated at 24, the ends extending to and at each side of the lug 14$^a$ and pivotally connecting thereto by means of the eye screw 25. An adjusting screw 26 is threaded through the arm 19, previously described, so that its lower end may come into contact with the upper end of the lug 14$^a$. A suitable lock nut 27 is located above the arm 19, screw 26 passing therethrough.

With water in the tank 1 at a predetermined level the float 21 is elevated, this turning the member 23 about the pivot 24 and thereby moving the cap 14 and the attached sleeve 12 in a downward direction so as to bring the washer 15 tightly against the upper end of the inlet pipe 8. When the tank is flushed and the water escapes therefrom through the outlet at 3 the float 21 lowers as the water falls in the tank, lifting sleeve 12 and cap 14 until stopped by engagement with the lower end of the screw 26, this elevating the washer 15 so that the water from the water main may enter the tank through the pipe 8. As it passes from the pipe 8 it must pass downwardly between said pipe and the inner side of the sleeve 12 and in so doing must pass around the various lugs 11. This checks the downward movement of the water and causes it to escape at the lower end of the sleeve 12 without noise or splashing, the water coming from the sleeve 12 being under the upper level of the body of the water within the tank. After the tank fills the float 21 rises and eventually brings the washer 15 into closing engagement with the upper end of the pipe 8.

It is evident that at times the washer 15 will become worn to such an extent that it should be replaced and this is very easily done by removing the screw 25 so that bar 17 and the parts connected thereto may be swung to one side about the pivot 18 leaving the cap 14 in position that it may be easily removed from the upper end of the sleeve 12, whereupon the washer 15 may be removed and replaced by another in better condition. The mere removal of one screw, that indicated at 25, makes the structure accessible for this repair.

The adjusting screw 26 is of value as it may be adjusted so as to control the outlet of water from the pipe 8. That is, when the water pressure is high the screw 26 should be screwed downwardly farther than when the water pressure is low in order that the outlet between the upper end of pipe 8 and the washer 15 shall be reduced. This is a very simple adjustment but one which is of value in connection with devices of this character.

The invention is defined in the claims appended hereto and I consider all modifications in structure coming within the scope of said claims to be comprehended by my invention.

I claim:

1. In a construction of the class described, a tank, a pipe passing through the bottom of said tank and secured thereto, said pipe extending vertically upward in the tank, a sleeve located around the pipe, a cap threaded on the upper end of the sleeve, a washer clamped between the upper end of the sleeve and said cap, an arm extending outwardly and upwardly from the lower portion of said pipe, a bar pivotally connected to said arm extending vertically to a point above the upper end of the sleeve, a rod pivotally connected between its ends to the bar, means for pivotally and detachably connecting one end of said rod to said cap, a float secured to the free end of the rod, said bar at its upper end above the point of pivotal connection of the rod thereto being formed with a horizontal arm located over said cap, and an adjusting screw threaded through said arm, the lower end thereof lying directly over the cap, substantially as described.

2. In a construction of the class described, a vertical pipe through which water may pass, said pipe at its lower end being provided with a base, an arm extending upwardly and outwardly from said base, a bar pivotally connected at its lower end to the arm and extending upwardly substantially parallel to the pipe and above the upper end thereof, said bar at its upper end being formed with a horizontal arm, an elongated sleeve located around the pipe between said pipe and bar, a cap threaded on to the upper end of the sleeve provided with an upwardly projecting lug, a washer clamped between the upper end of the sleeve and said cap to lie over the upper end of the pipe, a rod pivotally connected between its ends to said bar a short distance below said arm, means pivotally and detachably connecting one end of the rod to the lug on said cap, a float secured to the free end of the rod, and an adjusting screw threaded through the arm so that its lower end may lie directly over the upper end of said lug.

In testimony whereof I affix my signature.

JOHN J. SIEFEN.